(12) United States Patent
Chaudhury et al.

(10) Patent No.: US 7,734,118 B2
(45) Date of Patent: Jun. 8, 2010

(54) AUTOMATIC IMAGE FEATURE EMBEDDING

(75) Inventors: Krish Chaudhury, Milpitas, CA (US); Dejan Markovic, Sunnyvale, CA (US)

(73) Assignee: Adobe Systems Incorporated, San Jose, CA (US)

( * ) Notice: Subject to any disclaimer, the term of this patent is extended or adjusted under 35 U.S.C. 154(b) by 1163 days.

(21) Appl. No.: 10/991,643

(22) Filed: Nov. 17, 2004

(65) Prior Publication Data

US 2006/0104544 A1    May 18, 2006

(51) Int. Cl.
    *G06K 9/32* (2006.01)
(52) U.S. Cl. .................. 382/300; 382/264; 345/668
(58) Field of Classification Search ............... 382/300, 382/299, 264, 243; 345/647, 427; 348/580; 345/668
    See application file for complete search history.

(56) References Cited

U.S. PATENT DOCUMENTS

| | | | | | |
|---|---|---|---|---|---|
| 4,468,688 | A | * | 8/1984 | Gabriel et al. | 348/580 |
| 4,908,874 | A | * | 3/1990 | Gabriel | 382/277 |
| 5,175,808 | A | * | 12/1992 | Sayre | 345/647 |
| 5,457,747 | A | * | 10/1995 | Drexler et al. | 713/186 |
| 5,615,319 | A | * | 3/1997 | Metzger et al. | 345/427 |
| 5,963,213 | A | * | 10/1999 | Guedalia et al. | 345/427 |
| 6,573,889 | B1 | * | 6/2003 | Georgiev | 345/419 |
| 6,734,851 | B2 | | 5/2004 | Georgiev | |
| 7,209,258 | B1 | | 4/2007 | Markovic et al. | |
| 7,385,727 | B1 | | 6/2008 | Markovic et al. | |
| 2002/0085004 | A1 | * | 7/2002 | Lim et al. | 345/441 |
| 2004/0113910 | A1 | * | 6/2004 | Tsai et al. | 345/420 |
| 2004/0207631 | A1 | * | 10/2004 | Fenney et al. | 345/584 |
| 2006/0039623 | A1 | | 2/2006 | Chaudhury et al. | |

OTHER PUBLICATIONS

George Wolberg, "Digital Image Warping," IEEE Computer Society Press Order No. 1944, Los Alamitos, California, ISBN 0-8186-8944-7, pp. 222-240, 1990.
Wolberg, "Digital Image Warping" *IEEE Computer Society Press*, 1990, entire book.
George Wolberg, "Digital Image Warping," IEEE Computer Society Press Order No. 1944, Los Alamitos, California, ISBN 0-8186-8944-7, pp. 222-240, 1990.

* cited by examiner

*Primary Examiner*—Daniel G Mariam
*Assistant Examiner*—Aklilu K Woldemariam
(74) *Attorney, Agent, or Firm*—Fish & Richardson P.C.

(57) ABSTRACT

The invention features a method, system, and computer program product. A source bitmap image, a destination bitmap image, a source image feature outline surrounding a source region of the source bitmap image, and a destination image feature outline surrounding a destination region of the destination bitmap image are received. A point-to-point correspondence between the source image feature outline and the destination image feature outline is generated, such that the point-to-point correspondence defines a reshaping of the source image feature outline. An interpolation surface is calculated interpolating an area of the source bitmap image that includes the source region. The interpolation surface is reshaped using the point-to-point correspondence.

49 Claims, 7 Drawing Sheets

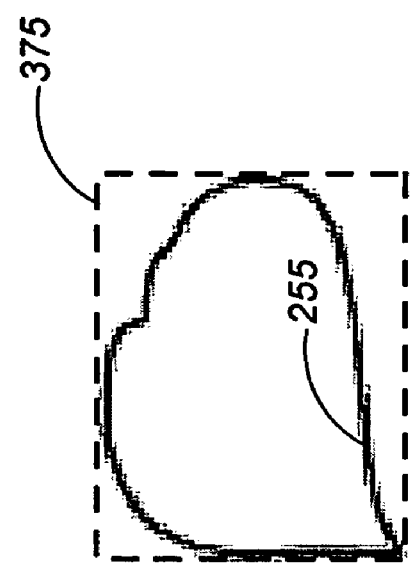
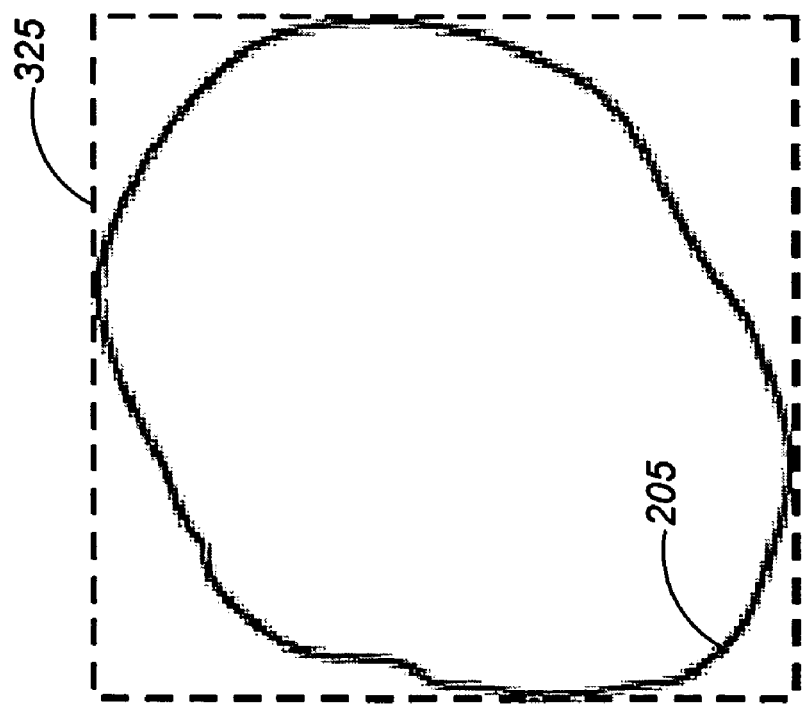
FIG. 3B
FIG. 3A

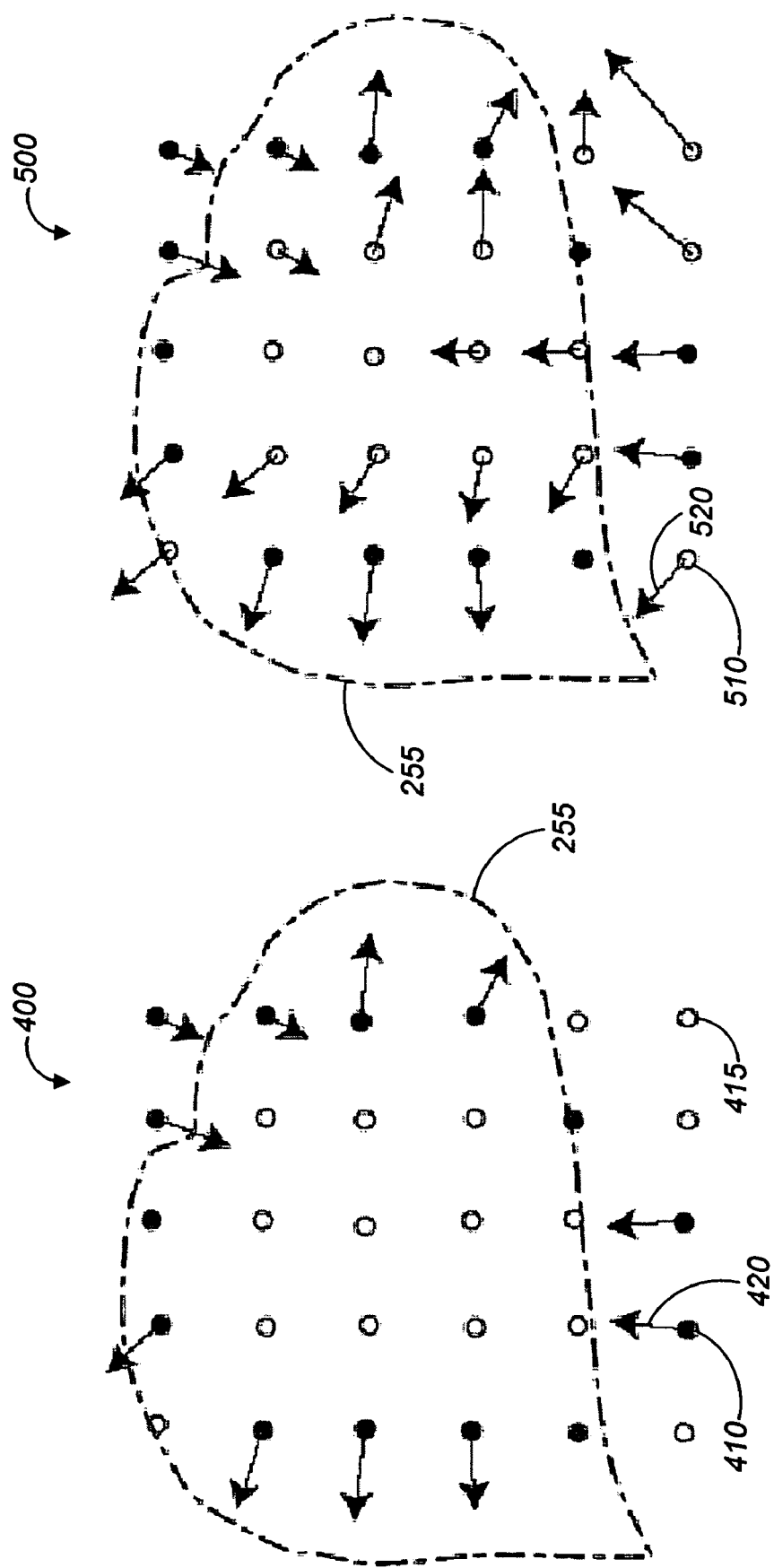

AUTOMATIC IMAGE FEATURE EMBEDDING

BACKGROUND

The present invention relates to digital imaging.

Single point image warping techniques are currently available for image deformation. For instance, Adobe® Photoshop® provides the liquefy feature, where a user can select an arbitrary pixel and specify its displacement. Neighboring pixels are displaced so as to create a smooth displacement field that dissipates slowly as one moves further away from the selected pixel. In order to perform image feature embedding by using the liquefy feature, the user has to figure out the appropriate scale factor for size alignment and then click and drag hundreds of points to achieve the shape alignment. This procedure is extremely tedious and error prone.

Mesh warping techniques are also available where the spatial relationship between image pixels is altered based on specified input displacements at a scattered subset of these pixels. This is typically done in two steps. First, a discrete displacement field, specifying the displacement for each pixel in the input image bitmap, is estimated based on the given input displacements at the scattered set of pixels. This displacement field is created to be as smooth as possible. Typically, this is done by fitting a smooth and continuous (local or global) function to the given set of input displacements. This function is then sampled at image bitmap positions to obtain the discrete displacement field. This process is known as coordinate resampling.

Coordinate resampling provides the displacement for pixels. Next, the pixels in the output bitmap must be painted. This is known as intensity resampling. In general, the displacement field does not map input pixels to output pixels with integer coordinates. Further, the displacement field is not invertible in most cases (i.e., output pixels cannot be mapped back to input pixels using closed form equations). An output accumulator can be used to address this problem. In this approach, the system walks over the input pixels, accumulating their contributions to each output pixel. The final color at each output pixel is a distance-weighted sum of the colors of input pixels that map to the neighborhood of that output pixel.

Another option is to compute the inverse mapping (i.e., output pixel to input pixel) in the coordinate resampling stage. In this manner, the computed displacement field maps the output to input. During intensity resampling, each output pixel is mapped to some location on the input image plane. In general, this would not be a pixel position in the input bitmap. Hence, some local interpolation scheme is generally used to obtain the color for the output pixel.

However, these typical methods of mesh warping suffer from a number of drawbacks. Chief among them is that they do not enforce any global smoothness measure on the generated output color field. It is desirable to have the ability to automatically modify the shape of one or more features in the image so as to match other specified shapes, with the variation in the color field caused by the warping conforming to some global smoothness norm. Without it, the result will be less visually pleasing and discontinuities may appear at certain locations within the image, causing the image to look torn.

SUMMARY

In one aspect, the invention features a method, system, and computer program product. A source bitmap image, a destination bitmap image, a source image feature outline surrounding a source region of the source bitmap image, and a destination image feature outline surrounding a destination region of the destination bitmap image are received. A point-to-point correspondence between the source image feature outline and the destination image feature outline is generated, such that the point-to-point correspondence defines a reshaping of the source image feature outline. An interpolation surface is calculated interpolating an area of the source bitmap image that includes the source region. The interpolation surface is reshaped using the point-to-point correspondence.

Implementations may include one or more of the following features. The reshaped interpolation surface corresponding to the source region may be rendered on the destination region of the destination bitmap image. The reshaped interpolation surface may be rendered on the destination bitmap image using the destination image feature outline as a clipping boundary. The interpolation surface may be a smooth surface in a three-dimensional space. The reshaping may conform to a displacement of points on the surface wherein points are not displaced in the color dimension.

In another aspect, the invention features a method, system, and computer program product. A source bitmap image, a destination bitmap image, a source image feature outline surrounding a source region of the source bitmap image, and a destination image feature outline surrounding a destination region of the destination bitmap image are received. A point-to-point correspondence between the destination image feature outline and the source image feature outline is generated, such that the point-to-point correspondence defines a reshaping of the destination image feature outline. An interpolation surface is calculated interpolating an area of the destination bitmap image that includes the destination region. The interpolation surface is reshaped using the point-to-point correspondence.

Implementations may include one or more of the following features. A second interpolation surface may be calculated interpolating the source bitmap image and the reshaped interpolation surface corresponding to the destination region may be rendered on a destination bitmap buffer, followed by the rendering of the second interpolation surface. The second interpolation surface may be rendered on the destination bitmap buffer using the transformed source image feature outline as a clipping boundary. The interpolation surface may be a smooth surface in a three-dimensional space. The reshaping may conform to a displacement of points on the surface wherein points are not displaced in the color dimension. The area of the destination bitmap image may include the destination region and a buffer region surrounding the destination region. The buffer region may be approximately ten pixels in width.

In a further aspect, the invention features a method, system, and computer program product. A source bitmap image, a destination bitmap image, a source image feature outline defined for the source bitmap image, and a destination image feature outline defined for the destination bitmap image are received. A B-spline surface is calculated that interpolates the source bitmap image bounded by the source feature outline, such that the B-spline surface has multiple control points. A mapping is calculated between the source image feature outline and the destination image feature outline, such that the mapping defines a respective displacement value for each one of a subset of anchor control points on the B-spline surface. Each anchor control point is displaced by the respective displacement value defined in the mapping. The control points of the B-spline surface are displaced, without further displacing the anchor control points and without changing any color of any control point, to generate a displaced B-spline surface.

Implementations may include one or more of the following features. The source image feature outline may be interpolated as a source B-spline curve and the destination image feature outline may be interpolated as a destination B-spline curve, such that each B-spline curve has multiple knots. User input pairing a first feature point on the source bitmap image and a second feature point on the destination bitmap image may be received, a point displacement value between the first feature point and the second feature point may be calculated, the first feature point and point displacement value may be included in the calculation of the mapping, and the first feature point may be included as an anchor control point that is not further displaced when the control points of the B-spline surface are displaced.

The displaced B spline surface may be rendered on a destination bitmap buffer using the destination image feature outline as a clipping boundary. The mapping may be based on the source image feature outline and the destination image feature outline. The control points of the B-spline surface may be displaced by iterative smoothing. The iterative smoothing may be achieved by iterative neighborhood smoothing of the displacements of the control points until the global Laplacian norm is minimized. The B-spline surface may be $C^2$ continuous across the entire surface. The B-spline surface may be calculated using a cubic B-spline function. The modified source surface may be used for intensity resampling.

In an additional aspect, the invention features a method, system, and computer program product. A source bitmap image, a destination bitmap image, a source image feature outline defined for the source bitmap image, and a destination image feature outline defined for the destination bitmap image are received. A B-spline surface is calculated that interpolates the destination bitmap image, such that the B-spline surface has multiple control points. A mapping is calculated between the destination image feature outline and the source image feature outline, such that the mapping defines a respective displacement value for each one of a subset of anchor control points. Each anchor control point is displaced by the respective displacement value defined in the mapping. The control points of the B-spline surface are displaced, without further displacing the anchor control points and without changing any color of any control point, to generate a displaced B-spline surface.

Implementations may include one or more of the following features. A second B-spline surface may be calculated that interpolates the source bitmap image and the displaced B-spline surface may be rendered on a destination bitmap buffer, followed by the rendering of the second B-spline surface. The mapping may be based on the source image feature outline and the destination image feature outline. The control points of the B-spline surface may be displaced by iterative smoothing. The iterative smoothing may be achieved by iterative neighborhood smoothing of the displacements of the control points until the global Laplacian norm is minimized. The B-spline surface may be $C^2$ continuous across the entire surface. The B-spline surface may be calculated using a cubic B-spline function. The modified source surface may be used for intensity resampling.

The source image feature outline may be interpolated as a source B-spline curve and the destination image feature outline may be interpolated as a destination B-spline curve, such that each B-spline curve has multiple knots. User input may be received pairing a first feature point on the source bitmap image and a second feature point on the destination bitmap image, a point displacement value may be calculated between the first feature point and the second feature point, the first feature point and point displacement value may be included in the calculation of the mapping, and the first feature point may be included as an anchor control point that is not further displaced when the control points of the B-spline surface are displaced.

In another aspect, the invention features a method, system, and computer program product. A smooth source curve defined on a source raster image and a smooth destination curve defined on a destination raster image are obtained, such that the smooth source curve and the smooth destination curve each is a closed curve. A smooth source surface is computed interpolating the source raster image inside the smooth source curve, the smooth source surface having surface control points, each surface control point having a position and a color. A transformation matrix is obtained that maps the bounding box source raster image to the bounding box enclosing the destination raster image. The transformation matrix is applied to the smooth source curve to obtain a transformed source curve. The transformation matrix is applied to the smooth source surface to obtain a transformed source surface. Multiple pairs of points are generated, each pair of points matching one source point on the transformed source curve to one destination point on the smooth destination curve, the source points all being distinct from each other, the destination points all being distinct from each other. For each pair of points, a closest control point on the mapped source surface to the source point of the pair of points is found, the found control point is displaced to a position determined by the destination point of the pair of points, the control point displaced thereby becoming an anchor control point. The anchor control points of the mapped source surface are displaced, without further displacing the anchor control point and without changing any color of any control point, to generate a smoothed, modified source surface. The modified source surface is rendered to the destination raster image using the smooth destination curve as a clipping boundary.

Implementations may include one or more of the following features. A source outline defined on the source raster image may be interpolated to generate the smooth source curve, and a destination outline defined on the destination raster image may be interpolated to generate the smooth destination curve. The source outline may be derived from a user input received on a graphical user interface displaying the source raster image and the destination outline is derived from a user input received on a graphical user interface displaying the destination raster image. The mapping may be obtained by calculating a mapping to map a center of the bounding box enclosing the smooth source curve to a center of the bounding box enclosing the smooth destination curve, and to scale the smooth source curve to have a size corresponding to a size of the smooth destination curve while preserving the aspect ratio of the scaled source curve. The smooth source curve may be a B-spline curve, the smooth destination curve may be a B-spline curve, and the smooth source surface may be a B-spline surface. The source points of the multiple pairs of points may be points on the mapped source curve that are uniformly separated in parameter space and are separated by approximately one pixel dimension on the destination raster image. The instructions to displace the control points of the mapped source surface to generate a modified source surface may comprise instructions to smooth a displacement vector field of displacements over all control points to minimize the Laplacian norms of the displacement vector field.

The invention can be implemented to realize one or more of the following advantages. The only user input required is a curve outlining the origin feature and a curve outlining the destination feature. The shape of a particular feature can be altered to match that of another feature in such a way that the repainted portion of the output color field has $C^2$ continuity.

An image feature can be copied and pasted over another feature in the same or a different image, such that the pasted feature blends in the new neighborhood in a smooth ($C^2$ continuous), visually pleasing manner. In all of the above situations, the pair of features involved can be different in size and shape. The technique does automatic resizing, reshaping, and blending.

The entire surface is said to be $C^2$ continuous if $C^2$ continuity exists at every point. In particular, a surface that is made up of a network of surface patches (e.g., the bicubic B spline surface) is $C^2$ continuous if $C^2$ continuity exists at points within patches, as well as at points on the junctions of two adjoining patches.

The proposed technique also offers a graceful and continuous quality versus performance tradeoff. Such a tradeoff can be very useful when generating animation sequences on the fly—intermediate frames in the sequence (which stay on the screen for only a short duration) can be generated with lower quality but higher performance while the final frame (which stays on the screen indefinitely) can be generated at high quality. The same framework can generate both kinds of output with the tuning of a single continuous parameter.

The details of one or more embodiments of the invention are set forth in the accompanying drawings and the description below. Other features, aspects, and advantages of the invention will become apparent from the description, the drawings, and the claims.

BRIEF DESCRIPTION OF THE DRAWINGS

FIGS. 3A and 3B show bounding boxes surrounding feature curves.

FIG. 4 shows a source surface with an initial displacement vector field as defined by a feature curve correspondence table.

FIG. 5 shows a source surface on which the displacement vector field has been iteratively smoothed.

Like reference numbers and designations in the various drawings indicate like elements.

DETAILED DESCRIPTION

Figure 1:
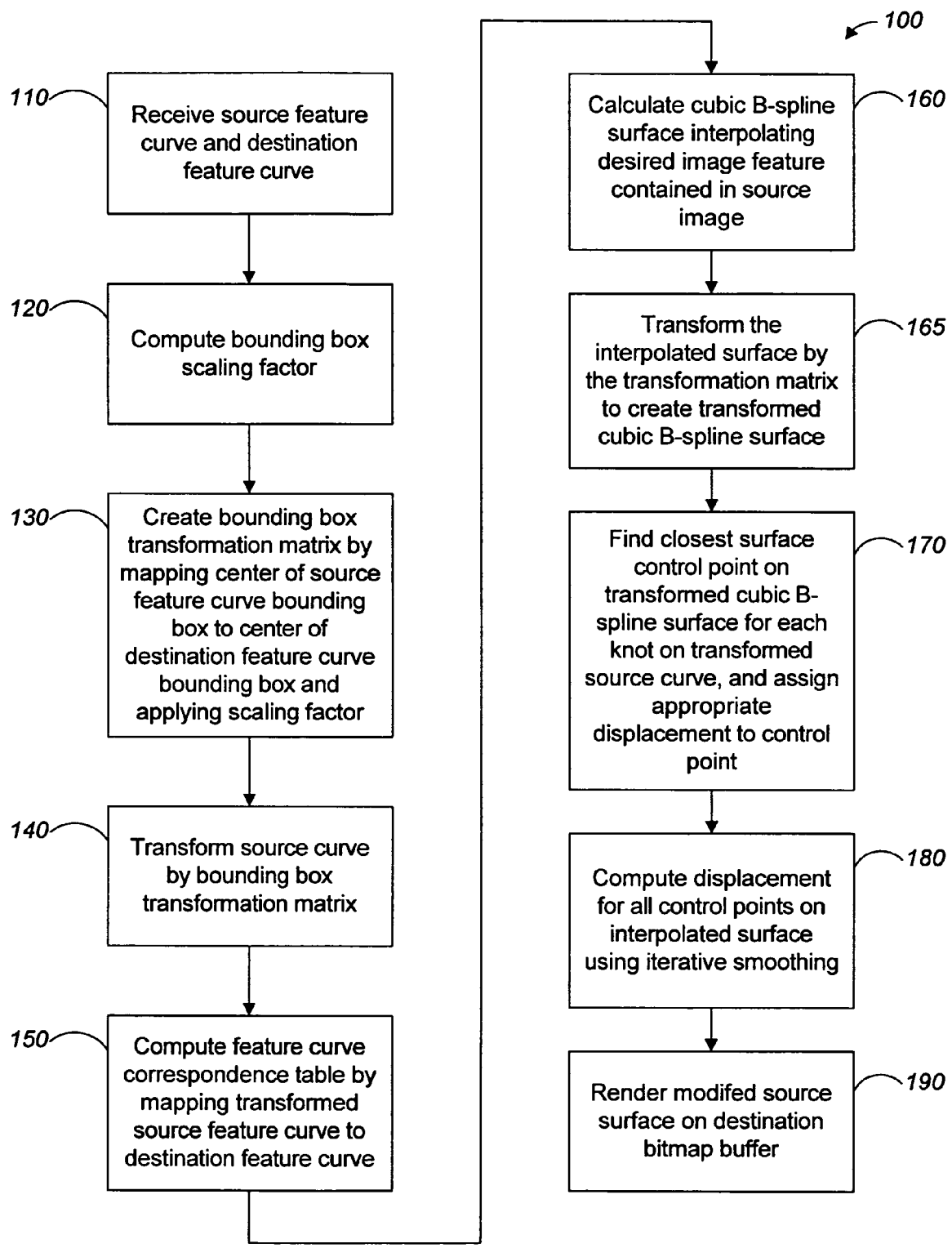
FIG. 1 is a flow chart illustrating how to copy a feature from a source image and embed it into a destination image.
Figure 2A:
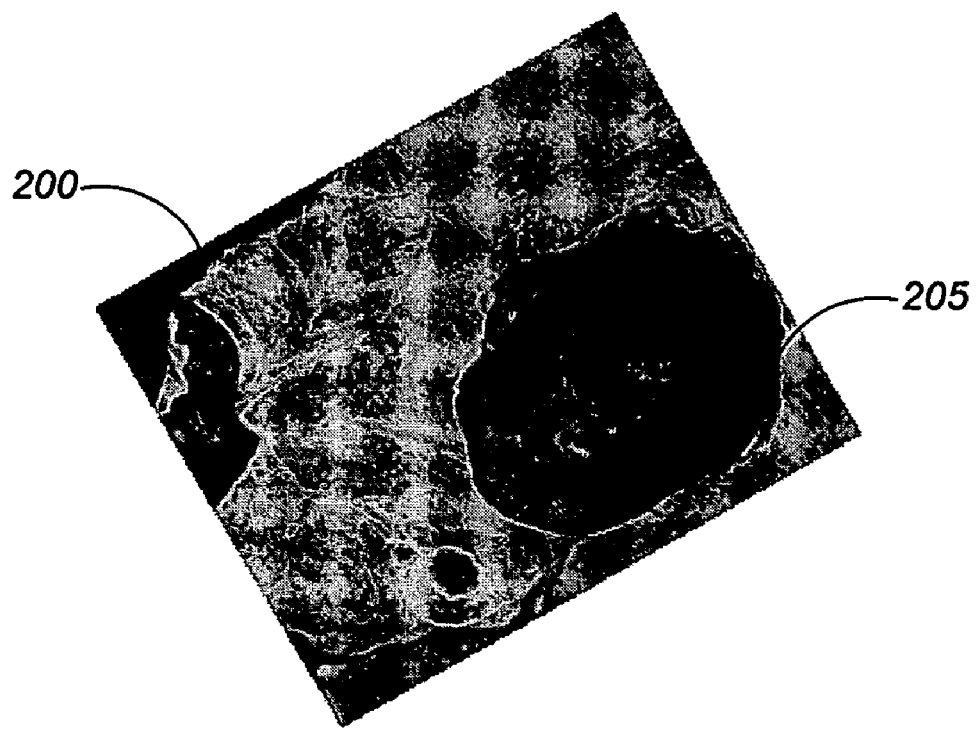
FIG. 2A shows a sample source image 200.

FIG. 1 shows a first method 100 for automatically copying a feature from a source image and embedding it into a destination image. In this implementation, the destination image is kept rigid, while the source image is mutated to fit within the desired area in the destination image. A system performing method 100 receives a source feature curve and a destination feature curve (step 110). These two curves are also known as a source image feature outline and a destination image feature outline, respectively. In one implementation, a user selects the source feature curve in the source image. As shown in FIG. 2A, a user can designate the source feature curve 205 by selecting the desired image feature from source image 200. In the example shown in FIG. 2A, the user has used the source feature curve 205 to select the baby's face as the desired image feature in the source image 200. The desired image feature is a subimage of the source image 200.

Figure 2B:
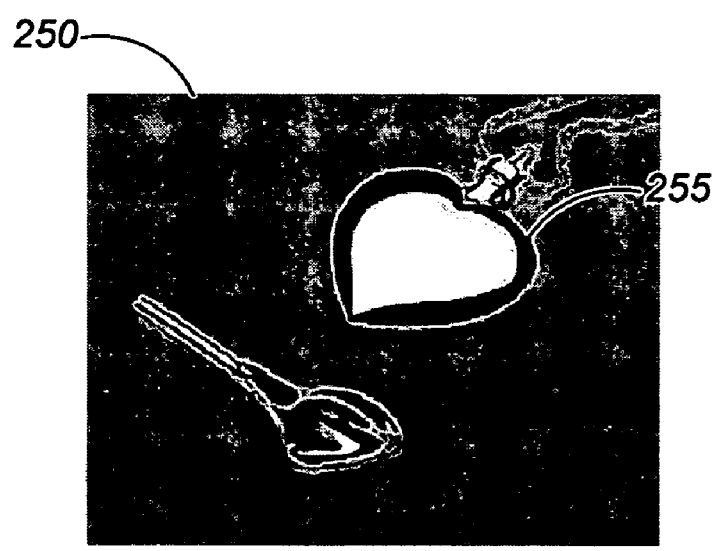
FIG. 2B shows a sample destination image 250.

The user designates a destination feature curve in the destination image. The destination feature curve indicates the location where the user wishes to place the desired image feature from the source image into the destination image. In FIG. 2B, the user has designated a feature curve 255 in the destination image 250. In the example shown, the user has designated a destination feature curve 255 within the image of the heart-shaped locket as the desired destination for the image feature, indicating that the user wishes to place the baby's face, the image feature from the source image, into the heart-shaped locket appearing in the destination image. The desired image feature is a subimage of the destination image 250.

The system computes a bounding box scaling factor (step 120). A first bounding box is created for the source feature curve Cs and a second bounding box is created for the destination feature curve Cd. Each bounding box is the smallest possible rectangular box, with sides parallel to the coordinate planes, that contains the feature curve. In one implementation, a padding value may be added to the bounding box, such that the bounding box is slightly larger than the smallest possible rectangular box as described above. In one implementation, the padding value results in the bounding box being approximately 10 pixels larger than the smallest possible rectangular box on each of the four sides of the bounding box.

A scaling factor is calculated between the source feature curve bounding box and the destination feature curve bounding box. FIGS. 3A and 3B show a representation of a bounding box. The source feature curve bounding box 325 contains the source feature curve 205, and the destination feature curve bounding box 375 contains the destination feature curve 255.

In one implementation, if the width of the source feature curve bounding box is greater than the height of the source feature curve bounding box, then the scaling factor is calculated by dividing the width of the destination feature curve bounding box by the width of the source feature curve bounding box. If the width of the source feature curve bounding box is less than the height of the source feature curve bounding box, then the scaling factor is calculated by dividing the height of the destination feature curve bounding box by the height of the source feature curve bounding box. If the source feature curve bounding box is square, either one of these calculations may be used to determine the scaling factor.

The system creates the bounding box transformation matrix M by mapping the center of the source feature curve bounding box to the center of the destination feature curve bounding box, and then applying the scaling factor (step 130). The transformation matrix M permits the translation and scaling of objects from the source image to the destination image.

The system transforms the source feature curve by the bounding box transformation matrix (step 140). The cubic B-spline curve Cs is transformed by applying the transformation matrix M to the control points of the B-spline curve to create a transformed source feature curve Cs'.

Uniform cubic B-spline curves are calculated to represent the source feature curve (Cs) and the destination feature curve (Cd). In one implementation, the B-spline curves Cs and Cd are calculated in such a way that there is one knot per data point. Alternatively, any suitable interpolation function may be used to interpolate the feature curves as selected by the user, e.g., any type of spline.

The system computes a feature curve correspondence table that maps the transformed source feature curve to the destination feature curve (step 150). The feature curve correspondence table has displacement vectors for all knot points on the transformed source curve. If the knot points on the transformed source curve are displaced by those vectors, the transformed source curve will be reshaped to approximately match the destination curve. The feature curve correspondence table represents a point-to-point correspondence between the source feature curve and the destination feature curve.

The cubic B-spline curve Cd is densely sampled in order to create a set of destination feature curve sampled points Cd'. Candidate match pairs are established by identifying the closest point on Cd' for each knot on Cs'. For each candidate match pair, the distance between the knot point on Cs' and the closest point on Cd' is calculated. In one implementation, the candidate match pair with the smallest distance is established as the initial match pair. In an alternative implementation, the user can select the candidate match pair that will be designated as the initial match pair.

In one implementation, a step length s for the destination feature curve is calculated by dividing the number of knots on Cd by the number of knots on Cs'. Starting at the knot point on Cs' defined by the initial match pair, discrete steps of length l in parameter space are taken on Cs', i.e., steps through successive knot points on Cs'. Simultaneously, starting at the point on Cd defined by the initial match pair, discrete steps of step length s in parameter space are taken on Cd. As the step sizes for each curve are proportional to the parameter space length of the respective curves, the same number of steps will cover both of the curves. Both curves, Cs' and Cd, are drawn in the same direction, either clockwise or counterclockwise. Further, both curves are closed curves. At each step, the knot index on Cs' and the parameter value on Cd are recorded as a matching pair in the feature curve correspondence table.

In an alternative implementation, the parameter space length of Cs' and Cd are compared. For the feature curve that is longer in parameter space, discrete steps of length l in parameter space are taken on it, i.e., steps through successive knot points. For the feature curve that is shorter in parameter space, a step length is calculated by dividing the number of knots on the shorter feature curve by the number of knots on the longer feature curve. As above, since the step sizes for each curve are proportional to the parameter space length of the respective curves, the same number of steps will cover both of the curves.

The system then calculates a cubic B-spline surface interpolating the desired image feature contained in the source image (step 160). The surface interpolating the desired image feature, Ss, is transformed by the transformation matrix M to create a transformed cubic B-spline surface Ss' (step 165).

The system finds the closest surface control point on the transformed cubic B-spline surface Ss' for each knot on the transformed source curve, and assigns an appropriate displacement to the control point (step 170). For each knot ks' on Cs', the closest control point on Ss' is found. A displacement, equal to the displacement corresponding to ks' in the feature curve correspondence table, is assigned to this surface control point. In this manner, displacements will be assigned to a scattered set of surface control points on Ss', designated as anchor control points.

FIG. 4 shows an interpolated surface 400 on which a scattered set of displacement vectors corresponding to step 170 is shown. In FIG. 4, anchor control points are shown as solid dots, e.g., control point 410, while other control points are shown as hollow dots, e.g., control point 415. For the surface control points 410, the displacement vector 420 is obtained from the feature curve correspondence table.

The system computes a displacement for all control points on the interpolated surface using iterative smoothing (step 180). In other words, the displacement field over the scattered set of control points on Ss' is now spread over the remaining control points (indicated by hollow dots) by a smoothing process.

The smoothing process does not alter the displacements for the anchor control points that were assigned in step 170. Rather, it assigns displacements to other control points so that the displacement field over all control points is smooth. These displacements of control points result in a reshaping of the interpolated surface. Computation of the smooth displacement field can be achieved by iterative neighborhood smoothing of the displacement field over the control points (with those corresponding to step 170 acting as "anchor points" and holding their values) until a global Laplacian norm is minimized. The color values of these control points do not change; rather, the positions of the control points change.

Alternative smoothing techniques are taught by U.S. Pat. Nos. 6,573,889 and 6,734,851. These techniques can be used to compute a smooth displacement field across the interpolated surface. In lieu of these techniques, any smoothing technique can be used to compute the displacement for all control points on the interpolated surface.

FIG. 5 shows an interpolated source surface 500 and a displacement vector field with displacements indicated by the feature curve correspondence table. By applying an iterative smoothing technique, for a given control point 510, a displacement value 520 is calculated.

Figure 6:
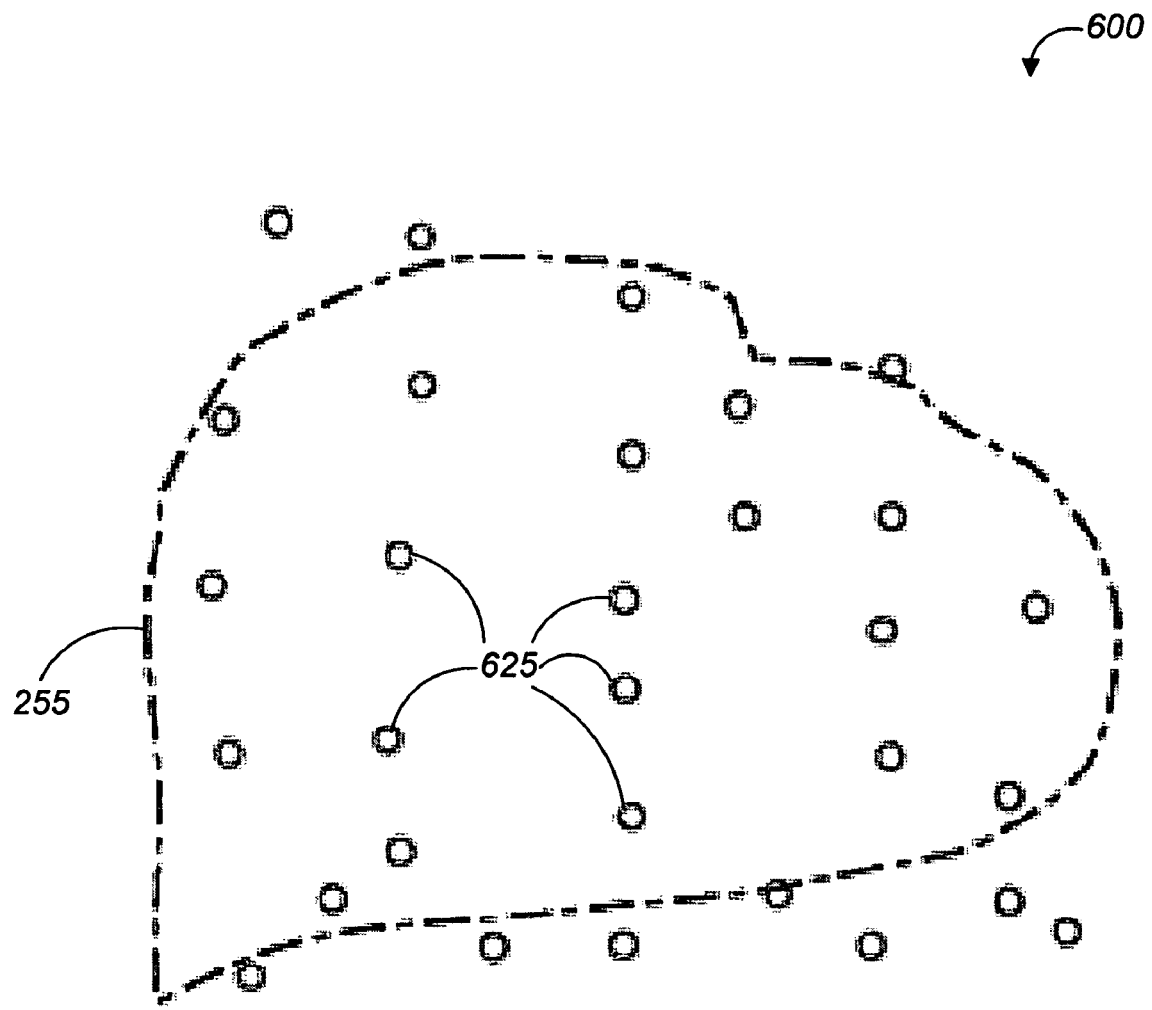
FIG. 6 shows a modified source surface after displacement vectors have been applied to control points.

The system renders the modified source surface on a destination bitmap buffer (step 190). The modified interpolation surface Ss', with displaced control points, is rendered on the destination bitmap buffer. The destination feature curve Cd can be used as a clipping boundary for the rendering process. FIG. 6 shows the modified source surface with the position of the control points moved according to the values contained in the displacement vector field. This modified source surface can then be rendered on the destination bitmap buffer, thereby inserting the desired source subimage into the desired destination subimage. As noted above, the destination feature curve Cd can be used as a clipping boundary. An alternative to rendering the modified source surface through a clipping path is to replace the color of each destination control point inside the clipping path with the corresponding color computed from the source surface and then render the destination surface. In one implementation, this enforces $C^2$ continuity across the clipping boundary, i.e., both approaches enforce $C^2$ continuity within the clipping boundary.

Figure 7:
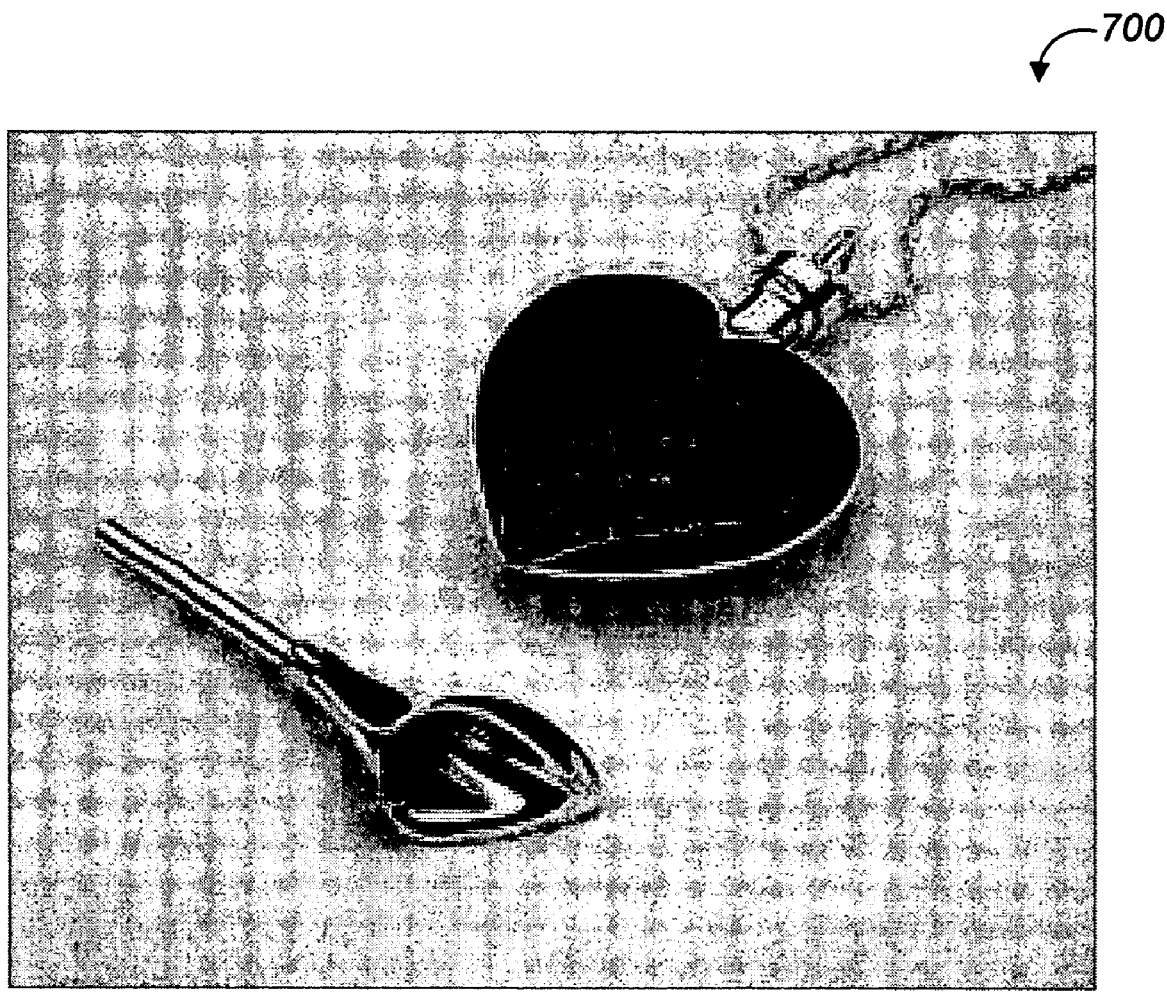
FIG. 7 shows a sample image resulting from a portion of the sample source image 200 being embedded into the sample destination image 250.

FIG. 7 shows a sample image resulting from a portion of the sample source image 200 (FIG. 2A) embedded into the sample destination image 250 (FIG. 2B).

$C^2$ continuity exists over an entire sub-image corresponding to the cubic B-spline surface that has been modified. In the above example, this includes the feature being reshaped, Ss, along with all points that move due to the reshaping, plus additional padding around the feature being reshaped. As a result, there is $C^2$ continuity over all pixels affected by the above manipulations; all other pixels are left undisturbed.

A parametric surface $Z(u, v)$, where u and v are the parameters, is $C^2$ continuous at some point $(u_0, v_0)$ if the following 3 conditions are satisfied:

(i) $Z(u, v)$ approaches $Z(u_0, v_0)$ as $(u, v)$ approaches $(u_0, v_0)$ from any direction in the 2D parameter plane;

(ii) $\partial Z(u, v)/\partial u$ and $\partial Z(u, v)/\partial v$ approach $\partial Z(u_0, v_0)/\partial u$ and $\partial Z(u_0, v_0)/\partial v$, respectively, as $(u, v)$ approaches $(u_0, v_0)$ from any direction in the 2D parameter plane; and (iii) $\partial^2 Z(u, v)/\partial u^2$ and $\partial^2 Z(u, v)/\partial v^2$ approach $\partial^2 Z(u_0, v_0)/\partial u^2$ and $\partial^2 Z(u_0, v_0)/\partial v^2$, respectively, as $(u, v)$ approaches $(u_0, v_0)$ from any direction in the 2D parameter plane.

Figure 8:
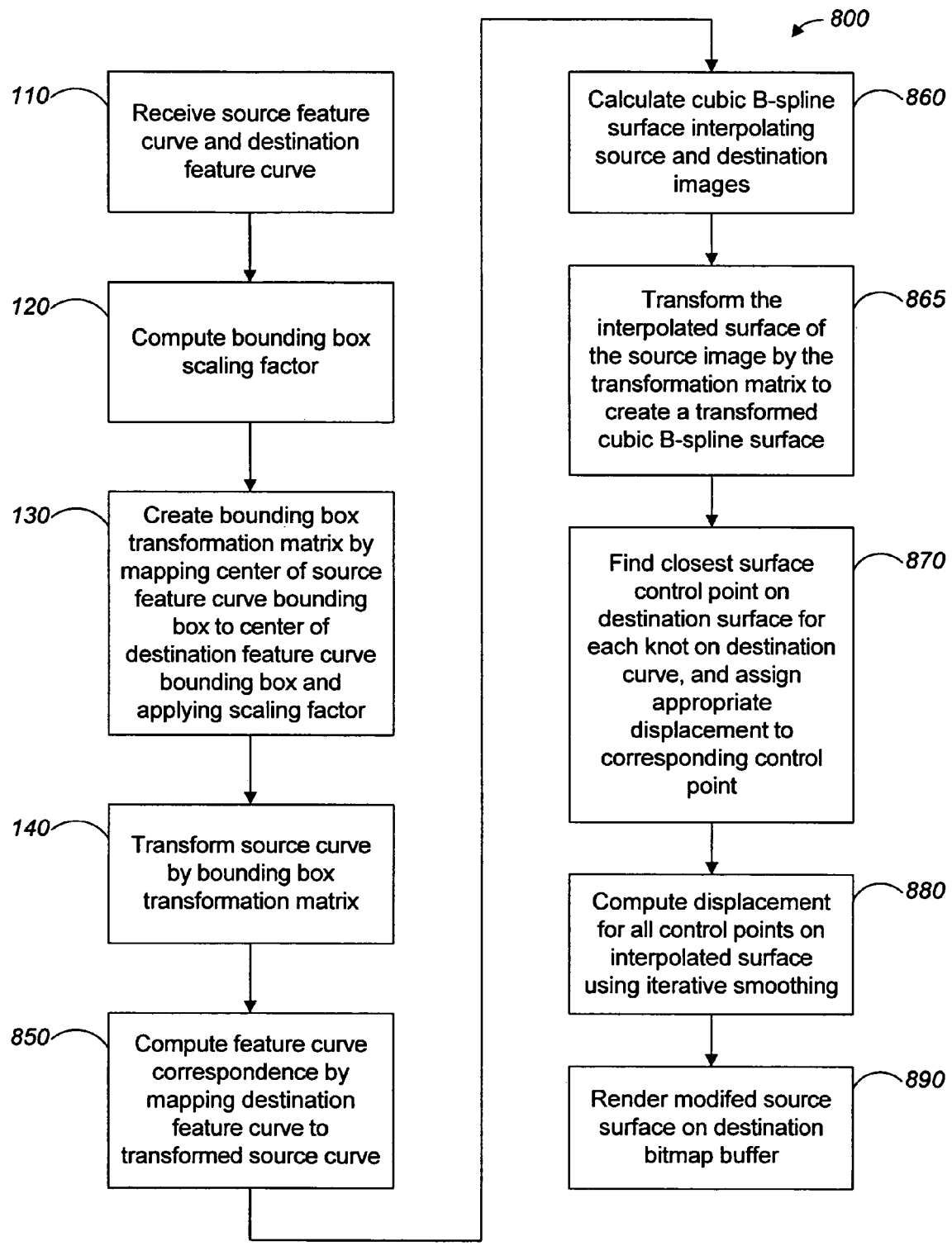
FIG. 8 is a flow chart illustrating how to copy a feature from a source image and embed it into a destination image.

FIG. 8 shows a second method 800 for automatically copying a feature from a source image and embedding it into a destination image. In this method, the source subimage is kept rigid, while the destination image is modified to fit the desired source subimage. A system performing method 800 receives a source feature curve and a destination feature curve (step 110). The system computes a bounding box alignment matrix (step 120). The system creates the bounding box transformation matrix M by mapping the center of the source feature curve bounding box to the center of the destination feature curve bounding box, and then applying the scaling factor (step 130). The system transforms the source feature curve by the bounding box transformation matrix (step 140). As indicated, up through this step, the first method and the second method are identical, and all of the alternatives described above for the first method also apply to this method.

Next, the system computes the feature curve correspondence by mapping the destination feature curve to the transformed source curve (step 850). The feature curve correspondence is a point-to-point correspondence between the destination feature curve and the transformed source feature curve. In one implementation, the cubic B-spline curve Cs' is densely sampled in order to create a set of transformed source feature curve points Cs". Candidate match pairs are established by identifying the closest point on Cs" for each knot on Cd. For each candidate match pair, the distance between the knot point on Cd and the closest point on Cs" is calculated, and the candidate match pair with the smallest distance is established as the initial match pair.

In one implementation, a step length s for the destination feature curve is calculated by dividing the number of knots on Cs' by the number of knots on Cd. Starting at the point on Cd defined by the initial match pair, discrete steps of length l in parameter space are taken on Cd, i.e., steps through successive knot points on Cd. Simultaneously, starting at the point on Cs" defined by the initial match pair, discrete steps of step length s in parameter space are taken on Cs". As the step sizes for each curve are proportional to the parameter space length of the respective curves, the same number of steps will cover both of the curves. Both curves, Cs" and Cd, are drawn in the same direction, either clockwise or counterclockwise. Further, both curves are closed curves. At each step, the knot index on Cd and the parameter value on Cs" are recorded as a matching pair in the feature curve correspondence table.

In an alternative embodiment, the parameter space length of Cs" and Cd are compared. For the feature curve that is longer in parameter space, discrete steps of length l in parameter space are taken on it, i.e., steps through successive knot points. For the feature curve that is shorter in parameter space, a step length is calculated by dividing the number of knots on the shorter feature curve by the number of knots on the longer feature curve. As above, because the step sizes for each curve are proportional to the parameter space length of the respective curves, the same number of steps will cover both of the curves.

The system calculate cubic B-spline surfaces interpolating the source and destination images (step 860). The interpolated surface from the source image, Ss, is transformed by the transformation matrix M to create a transformed cubic B-spline surface Ss' (step 865).

The system finds the closest surface control point on the destination surface for each knot on the destination curve Cd, and assigns an appropriate displacement to the corresponding control point (step 870). For each knot on Cd, the closest control point on the interpolated surface from the destination image, Sd, is found, and a displacement is assigned to this control point so that the displaced control point will be at the location indicated by the feature curve correspondence table for the given knot point. In this manner, displacements will be assigned to a scattered set of control points on Sd, designated as anchor control points.

The system computes a displacement for all control points on the interpolated surface using iterative smoothing (step 880). The interpolation surface Sd is modified by assigning a displacement value to each control point that is not an anchor control point. The color values of the control points do not change; rather, the positions of the control points change. Through this process, the destination image will be modified such that a space is created into which the transformed source image may be placed. This results in a reshaping of the interpolated surface. This can be achieved by iterative neighborhood smoothing of the displacement field over the control points until the global Laplacian norm is minimized.

Alternative smoothing techniques are taught by U.S. Pat. Nos. 6,573,889 and 6,734,851. These techniques can be used to compute a smooth displacement field across the interpolated surface. In lieu of these techniques, any smoothing technique can be used to compute the displacement for all control points on the interpolated surface.

The system renders the modified source surface on a destination bitmap buffer (step 890). The modified interpolation surface Sd is rendered on the destination bitmap buffer. The transformed source feature curve Cs' is used as a clipping boundary.

In an alternative implementation, the described method is repeated for each color plane. In the above implementations, only one color value plane is represented. For a grayscale image, only one color component value need be defined for each image, and the one color value would represent the gray value for each individual pixel, ranging from solid white to solid black. For a color image, multiple color component values will likely be defined, each color component value having its own value defined in a separate color plane. For example, color images may be represented in the RGB color space, each pixel having three color values of red, green and blue. Color images may be represented in other color spaces, e.g., the CMYK color space, having four color component values of cyan, magenta, yellow, and black. In such a case, where the images have more than one color plane, the implementation provided for a single color plane can be repeated for each color plane, until all color planes have been processed. Accordingly, this process is independent of the image color space.

In an additional implementation, the user can define individual point displacements between the source image feature and the destination image feature in addition to the selection of the source feature curve and the destination feature curve. For example, a user may wish to identify a pair of feature points, one feature point on the source image and one feature point on the destination image, so that the identified feature point on the source image is modified in such a manner so that this point is moved to the specified feature point on the destination image. Further, a user can identify multiple pairs of feature points to further distinguish how the source feature image should be modified.

If a user selects one or more feature point pairings, the displacement between the selected feature points can be calculated, and the selected feature points and calculated displacements are included among the scattered set of control points on Ss' or Sd, depending on the method being used. In this manner, an appropriate displacement is assigned to the corresponding control point for each knot on the source curve, as well as each control point identified by the user as a selected feature point. When the selected iterative smoothing technique is applied to calculate the displacement for all control points on the interpolated surface that do not yet have a displacement assigned to them, the displacement defined by the user-selected feature point pairing is integrated into the iterative smoothing process for the entire image. This provides the user with additional control over how the feature from the source image will be modified to fit within the destination image feature, or conversely, how the destination image feature will be modified to fit the source image feature.

The invention and all of the functional operations described in this specification can be implemented in digital electronic circuitry, or in computer software, firmware, or hardware, including the structural means disclosed in this specification and structural equivalents thereof, or in combinations of them. The invention can be implemented as one or more computer program products, i.e., one or more computer programs tangibly embodied in an information carrier, e.g., in a machine-readable storage device or in a propagated signal, for execution by, or to control the operation of, data processing apparatus, e.g., a programmable processor, a computer, or multiple computers. A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, subprograms, or portions of code). A computer program can be deployed to be executed on one computer or on multiple computers at one site or distributed across multiple sites and interconnected by a communication network.

The processes and logic flows described in this specification, including the method steps of the invention, can be performed by one or more programmable processors executing one or more computer programs to perform functions of the invention by operating on input data and generating output. The processes and logic flows can also be performed by, and apparatus of the invention can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The invention has been described in terms of particular embodiments. Other embodiments are within the scope of the following claims. For example, the steps of the invention can be performed in a different order and still achieve desirable results.

What is claimed is:

1. A machine-readable storage device encoded with a computer program, the computer program comprising instructions that when executed by a programmable processor of a computer cause the computer to perform operations comprising:

receiving in the computer a source bitmap image, a destination bitmap image, a source image feature outline defined for the source bitmap image, and a destination image feature outline defined for the destination bitmap image;

interpolating the source image feature outline as a source B-spline curve and the destination image feature outline as a destination B-spline curve, wherein the source B-spline curve and destination B-spline curve each has multiple knots;

calculating a B-spline surface that interpolates the source bitmap image bounded by the source image feature outline, wherein the B-spline surface has multiple surface control points;

calculating a mapping between the source image feature outline and the destination image feature outline, wherein the mapping defines a respective displacement value for each one of one or more anchor control points, each anchor control point identified as a surface control point of the B-spline surface that is closest to a respective knot of the source B-spline curve, and not all surface control points are anchor control points;

displacing each anchor control point by the respective displacement value defined in the mapping; and displacing the surface control points of the B-spline surface that are not anchor control points, without further displacing the anchor control points and without changing any color of any surface control point, to generate a displaced B-spline surface, wherein the displaced B-spline surface is $C^2$ continuous across an entirety of the displaced B-spline surface;

wherein the interpolating is performed by one or more processors of the computer.

2. The machine-readable storage device encoded with the computer program of claim 1, the computer program further comprising instructions that when executed by the programmable processor cause the computer to perform operations comprising:

receiving in the computer user input pairing a first feature point on the source bitmap image and a second feature point on the destination bitmap image;

calculating a point displacement value between the first feature point and the second feature point;

including the first feature point and point displacement value in the calculation of the mapping; and including the first feature point as an anchor control point that is not further displaced when the surface control points of the B-spline surface are displaced.

3. The machine-readable storage device encoded with the computer program of claim 1, the computer program further comprising instructions that when executed by the programmable processor cause the computer to perform operations comprising:
rendering the displaced B-spline surface on a destination bitmap buffer using the destination image feature outline as a clipping boundary.

4. The machine-readable storage device encoded with the computer program of claim 1, wherein the mapping is based on the source image feature outline and the destination image feature outline.

5. The machine-readable storage device encoded with the computer program of claim 1, wherein the surface control points of the B-spline surface are displaced by iterative smoothing.

6. The machine-readable storage device encoded with the computer program of claim 5, wherein the iterative smoothing is achieved by iterative neighborhood smoothing of the displacements of the surface control points until the global Laplacian norm is minimized.

7. The machine-readable storage device encoded with the computer program of claim 1, wherein the B-spline surface is calculated using a cubic B-spline function.

8. The machine-readable storage device encoded with the computer program of claim 1, wherein the modified source surface is used for intensity resampling.

9. A machine-readable storage device encoded with a computer program, the computer program comprising instructions that when executed by a programmable processor of a computer cause the computer to perform operations comprising:
receiving in the computer a source bitmap image, a destination bitmap image, a source image feature outline defined for the source bitmap image, and a destination image feature outline defined for the destination bitmap image;
interpolating the source image feature outline as a source B-spline curve and the destination image feature outline as a destination B-spline curve, wherein the source B-spline curve and destination B-spline curve each has multiple knots;
calculating a B-spline surface that interpolates the destination bitmap image, wherein the B-spline surface has multiple surface control points;
calculating a mapping between the destination image feature outline and the source image feature outline, wherein the mapping defines a respective displacement value for each one of one or more anchor control points, each anchor control point identified as a surface control point of the B-spline surface that is closest to a respective knot of the destination B-spline curve, and not all surface control points are anchor control points;
displacing each anchor control point by the respective displacement value defined in the mapping; and
displacing the surface control points of the B-spline surface that are not anchor control points, without further displacing the anchor control points and without changing any color of any surface control point, to generate a displaced B-spline surface, wherein the displaced B-spline surface is $C^2$ continuous across an entirety of the displaced B-spline surface;
wherein the interpolating is performed by one or more processors of the computer.

10. The machine-readable storage device encoded with the computer program of claim 9, the computer program further comprising instructions that when executed by the programmable processor cause the computer to perform operations comprising:
calculating a second B-spline surface that interpolates the source bitmap image;
rendering the displaced B-spline surface on a destination bitmap buffer; and
rendering the second interpolation surface on the destination bitmap buffer.

11. The machine-readable storage device encoded with the computer program of claim 9, wherein the mapping is based on the source image feature outline and the destination image feature outline.

12. The machine-readable storage device encoded with the computer program of claim 9, wherein the surface control points of the B-spline surface are displaced by iterative smoothing.

13. The machine-readable storage device encoded with the computer program of claim 12, wherein the iterative smoothing is achieved by iterative neighborhood smoothing of the displacements of the surface control points until the global Laplacian norm is minimized.

14. The machine-readable storage device encoded with the computer program of claim 9, wherein the B-spline surface is calculated using a cubic B-spline function.

15. The machine-readable storage device encoded with the computer program of claim 9, wherein the modified source surface is used for intensity resampling.

16. The machine-readable storage device encoded with the computer program of claim 9, the computer program further comprising instructions that when executed by the programmable processor cause the computer to perform operations comprising:
receiving in a computer user input pairing a first feature point on the source bitmap image and a second feature point on the destination bitmap image;
calculating a point displacement value between the first feature point and the second feature point;
including the first feature point and point displacement value in the calculation of the mapping; and
including the first feature point as an anchor control point that is not further displaced when the surface control points of the B-spline surface are displaced.

17. A computer-implemented method comprising:
receiving a source bitmap image, a destination bitmap image, a source image feature outline defined for the source bitmap image, and a destination image feature outline defined for the destination bitmap image;
interpolating the source image feature outline as a source B-spline curve and the destination image feature outline as a destination B-spline curve, wherein the source B-spline curve and destination B-spline curve each has multiple knots;
calculating a B-spline surface that interpolates the source bitmap image bounded by the source image feature outline, wherein the B-spline surface has multiple surface control points;
calculating a mapping between the source image feature outline and the destination image feature outline, wherein the mapping defines a respective displacement value for each one of one or more anchor control points, each anchor control point identified as a surface control point of the B-spline surface that is closest to a respective knot of the source B-spline curve, and not all surface control points are anchor control points;

displacing each anchor control point by the respective displacement value defined in the mapping; and displacing the surface control points of the B-spline surface that are not anchor control points, without further displacing the anchor control points and without changing any color of any surface control point, to generate a displaced B-spline surface, wherein the displaced B-spline surface is $C^2$ continuous across an entirety of the displaced B-spline surface;

wherein the interpolating is performed by one or more processors of a computer.

18. The method of claim 17, further comprising:

rendering the displaced B-spline surface on a destination bitmap buffer using the destination image feature outline as a clipping boundary.

19. The method of claim 17, wherein the surface control points of the B-spline surface are displaced by iterative smoothing.

20. A computer-implemented method comprising:

receiving a source bitmap image, a destination bitmap image, a source image feature outline defined for the source bitmap image, and a destination image feature outline defined for the destination bitmap image;

interpolating the source image feature outline as a source B-spline curve and the destination image feature outline as a destination B-spline curve, wherein the source B-spline curve and destination B-spline curve each has multiple knots;

calculating a B-spline surface that interpolates the destination bitmap image, wherein the B-spline surface has multiple surface control points;

calculating a mapping between the destination image feature outline and the source image feature outline, wherein the mapping defines a respective displacement value for each one of one or more anchor control points, each anchor control point identified as a surface control point of the B-spline surface that is closest to a respective knot of the destination B-spline curve, and not all surface control points are anchor control points;

displacing each anchor control point by the respective displacement value defined in the mapping; and displacing the surface control points of the B-spline surface that are not anchor control points, without further displacing the anchor control points and without changing any color of any surface control point, to generate a displaced B-spline surface, wherein the displaced B-spline surface is $C^2$ continuous across an entirety of the displaced B-spline surface;

wherein the interpolating is performed by one or more processors of a computer.

21. The method of claim 20, further comprising:

calculating a second B-spline surface that interpolates the source bitmap image;

rendering the displaced B-spline surface on a destination bitmap buffer; and rendering the second interpolation surface on the destination bitmap buffer.

22. The method of claim 20, wherein the surface control points of the B-spline surface are displaced by iterative smoothing.

23. The method of claim 17, further comprising:

receiving user input pairing a first feature point on the source bitmap image and a second feature point on the destination bitmap image;

calculating a point displacement value between the first feature point and the second feature point;

including the first feature point and point displacement value in the calculation of the mapping; and including the first feature point as an anchor control point that is not further displaced when the surface control points of the B-spline surface are displaced.

24. The method of claim 17, wherein the mapping is based on the source image feature outline and the destination image feature outline.

25. The method of claim 19, wherein the iterative smoothing is achieved by iterative neighborhood smoothing of the displacements of the surface control points until the global Laplacian norm is minimized.

26. The method of claim 17, wherein the B-spline surface is calculated using a cubic B-spline function.

27. The method of claim 17, wherein the modified source surface is used for intensity resampling.

28. The method of claim 20, wherein the mapping is based on the source image feature outline and the destination image feature outline.

29. The method of claim 22, wherein the iterative smoothing is achieved by iterative neighborhood smoothing of the displacements of the surface control points until the global Laplacian norm is minimized.

30. The method of claim 20, wherein the B-spline surface is calculated using a cubic B-spline function.

31. The method of claim 20, wherein the modified source surface is used for intensity resampling.

32. The method of claim 20, further comprising:

receiving user input pairing a first feature point on the source bitmap image and a second feature point on the destination bitmap image;

calculating a point displacement value between the first feature point and the second feature point;

including the first feature point and point displacement value in the calculation of the mapping; and including the first feature point as an anchor control point that is not further displaced when the surface control points of the B-spline surface are displaced.

33. A system comprising:

a user interface device; and one or more computers coupled with the user interface device, which:

receive a source bitmap image, a destination bitmap image, a source image feature outline defined for the source bitmap image, and a destination image feature outline defined for the destination bitmap image;

interpolate the source image feature outline as a source B-spline curve and the destination image feature outline as a destination B-spline curve, wherein the source B-spline curve and destination B-spline curve each has multiple knots;

calculate a B-spline surface that interpolates the source bitmap image bounded by the source image feature outline, wherein the B-spline surface has multiple surface control points;

calculate a mapping between the source image feature outline and the destination image feature outline, wherein the mapping defines a respective displacement value for each one of one or more anchor control points, each anchor control point identified as a surface control point of the B-spline surface that is closest to a respective knot of the source B-spline curve, and not all surface control points are anchor control points;

displace each anchor control point by the respective displacement value defined in the mapping; and displace the surface control points of the B-spline surface that are not anchor control points, without further displacing the anchor control points and without changing any color of any surface control point, to generate a displaced B-spline surface, wherein the displaced B-spline surface is $C^2$ continuous across an entirety of the displaced B-spline surface.

34. The system of claim 33, wherein the one or more computers are further operable to:
receive user input from the user interface device pairing a first feature point on the source bitmap image and a second feature point on the destination bitmap image;
calculate a point displacement value between the first feature point and the second feature point;
include the first feature point and point displacement value in the calculation of the mapping; and
include the first feature point as an anchor control point that is not further displaced when the surface control points of the B-spline surface are displaced.

35. The system of claim 33, wherein the one or more computers are further operable to:
render the displaced B-spline surface on a destination bitmap buffer using the destination image feature outline as a clipping boundary.

36. The system of claim 33, wherein the mapping is based on the source image feature outline and the destination image feature outline.

37. The system of claim 33, wherein the surface control points of the B-spline surface are displaced by iterative smoothing.

38. The system of claim 37, wherein the iterative smoothing is achieved by iterative neighborhood smoothing of the displacements of the surface control points until the global Laplacian norm is minimized.

39. The system of claim 33, wherein the B-spline surface is calculated using a cubic B-spline function.

40. The system of claim 33, wherein the modified source surface is used for intensity resampling.

41. A system comprising:
a user interface device; and
one or more computers coupled with the user interface device, which:
receive a source bitmap image, a destination bitmap image, a source image feature outline defined for the source bitmap image, and a destination image feature outline defined for the destination bitmap image;
interpolate the source image feature outline as a source B-spline curve and the destination image feature outline as a destination B-spline curve, wherein the source B-spline curve and destination B-spline curve each has multiple knots;
calculate a B-spline surface that interpolates the destination bitmap image, wherein the B-spline surface has multiple surface control points;
calculate a mapping between the destination image feature outline and the source image feature outline, wherein the mapping defines a respective displacement value for each one of one or more anchor control points, each anchor control point identified as a surface control point of the B-spline surface that is closest to a respective knot of the destination B-spline curve, and not all surface control points are anchor control points;
displace each anchor control point by the respective displacement value defined in the mapping; and
displace the surface control points of the B-spline surface that are not anchor control points, without further displacing the anchor control points and without changing any color of any surface control point, to generate a displaced B-spline surface, wherein the displaced B-spline surface is $C^2$ continuous across an entirety of the displaced B-spline surface.

42. The system of claim 41, wherein the one or more computers are further operable to:
calculate a second B-spline surface that interpolates the source bitmap image;
render the displaced B-spline surface on a destination bitmap buffer; and
render the second interpolation surface on the destination bitmap buffer.

43. The system of claim 41, wherein the mapping is based on the source image feature outline and the destination image feature outline.

44. The system of claim 41, wherein the surface control points of the B-spline surface are displaced by iterative smoothing.

45. The system of claim 44, wherein the iterative smoothing is achieved by iterative neighborhood smoothing of the displacements of the surface control points until the global Laplacian norm is minimized.

46. The system of claim 41, wherein the B-spline surface is $C^2$ continuous across the entire surface.

47. The system of claim 41, wherein the B-spline surface is calculated using a cubic B-spline function.

48. The system of claim 41, wherein the modified source surface is used for intensity resampling.

49. The system of claim 41, wherein the one or more computers are further operable to:
receive user input from the user interface device pairing a first feature point on the source bitmap image and a second feature point on the destination bitmap image;
calculate a point displacement value between the first feature point and the second feature point;
include the first feature point and point displacement value in the calculation of the mapping; and
include the first feature point as an anchor control point that is not further displaced when the surface control points of the B-spline surface are displaced.

* * * * *